(12) United States Patent
Kipp (10) Patent No.: US 10,093,298 B2
(45) Date of Patent: Oct. 9, 2018

(54) ABNORMAL BRAKE BEHAVIOR DETECTION

(71) Applicant: Goodrich Corporation, Charlotte, NC (US)

(72) Inventor: Richard A. Kipp, Oakwood, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 14/991,290

(22) Filed: Jan. 8, 2016

(65) Prior Publication Data
US 2017/0197606 A1 Jul. 13, 2017

(51) Int. Cl.
| G01C 23/00 | (2006.01) |
| --- | --- |
| G05D 3/00 | (2006.01) |
| G06F 17/00 | (2006.01) |
| B60T 17/22 | (2006.01) |
| B60T 8/17 | (2006.01) |
| B60T 8/88 | (2006.01) |
| B60T 13/74 | (2006.01) |
| B64C 25/44 | (2006.01) |
| G01L 5/28 | (2006.01) |
| B60T 8/32 | (2006.01) |

(52) U.S. Cl.
CPC .......... *B60T 17/221* (2013.01); *B60T 8/1703* (2013.01); *B60T 8/885* (2013.01); *B60T 13/741* (2013.01); *B64C 25/44* (2013.01); *G01L 5/28* (2013.01); *B60T 8/325* (2013.01); *B60T 2270/406* (2013.01)

(58) Field of Classification Search
None
See application file for complete search history.

(56) References Cited

U.S. PATENT DOCUMENTS

| 4,995,483 A | 2/1991 | Moseley et al. | |
| --- | --- | --- | --- |
| 8,489,302 B2* | 7/2013 | Cahill | B60T 8/00 701/34.4 |
| 8,666,625 B1* | 3/2014 | Georgin | B60T 8/1703 701/70 |
| 8,978,834 B2* | 3/2015 | Cahill | B60T 7/042 188/1.11 E |
| 9,434,369 B1* | 9/2016 | Georgin | B60T 17/22 |
| 2001/0020800 A1* | 9/2001 | Isono | B60T 8/3275 303/113.1 |
| 2005/0269872 A1 | 12/2005 | Ralea | |
| 2006/0163939 A1* | 7/2006 | Kuramochi | B60T 8/885 303/122.04 |
| 2007/0235267 A1* | 10/2007 | Liebert | B60T 7/108 188/1.11 L |
| 2008/0154470 A1* | 6/2008 | Goranson | B60T 7/042 701/70 |

(Continued)

FOREIGN PATENT DOCUMENTS

EP 2353951 8/2011

OTHER PUBLICATIONS

Extended European Search Report dated Jun. 8, 2017 in European Application No. 17150577.9.

*Primary Examiner* — Bhavesh V Amin
(74) *Attorney, Agent, or Firm* — Snell & Wilmer L.L.P.

(57) ABSTRACT

The present disclosure relates to brake control and monitoring, and more particularly, to a brake control and monitoring system that monitors brake actuation force.

11 Claims, 6 Drawing Sheets

(56) References Cited

U.S. PATENT DOCUMENTS

| | | | |
|---|---|---|---|
| 2009/0084637 A1* | 4/2009 | Bailey | F16D 66/021 |
| | | | 188/1.11 E |
| 2009/0276133 A1* | 11/2009 | May | B60T 7/042 |
| | | | 701/75 |
| 2009/0278401 A1* | 11/2009 | Summers | B60T 13/741 |
| | | | 303/20 |
| 2010/0101068 A1* | 4/2010 | Kipp | F16D 65/0043 |
| | | | 29/402.08 |
| 2011/0100769 A1* | 5/2011 | Frank | B60T 8/1703 |
| | | | 188/106 R |
| 2011/0155521 A1* | 6/2011 | Thibault | B60L 7/003 |
| | | | 188/106 P |
| 2012/0065816 A1* | 3/2012 | Cahill | B60T 8/00 |
| | | | 701/3 |
| 2014/0158474 A1* | 6/2014 | Drennen | F16D 55/36 |
| | | | 188/1.11 E |
| 2015/0115778 A1 | 4/2015 | Drennen et al. | |
| 2016/0001753 A1 | 1/2016 | Georgin et al. | |
| 2016/0325827 A1* | 11/2016 | Georgin | B60T 8/1703 |

* cited by examiner

ABNORMAL BRAKE BEHAVIOR DETECTION

FIELD

The present disclosure relates to brakes, and more particularly, to a system that detects abnormal brake behavior.

BACKGROUND

Brake behavior monitoring systems, which may be utilized to indicate the health status of the aircraft brake system, or to indicate a problem with the brake system, may compare a measured brake actuation force to a predetermined value, such as a desired actuator braking force/desired brake torque. Another method may involve comparing the difference between brake forces for brakes on the same axle to a predetermined value. As accurate and early detection of possible mechanical faults in the brakes of an aircraft brake system is important for safety and airline service efficiency, improved methods of determining health status of the aircraft brake system are desired.

SUMMARY

A force sensing braking module is disclosed. The force sensing braking module includes a control and sense wire harness, and a load cell disposed in a load path between a plurality of motors and an aircraft main landing gear brake stack. The load cell provides a measured actuation force signal representative of a force exerted by the plurality of motors on the aircraft main landing gear brake stack to the control and sense wire harness. The module further includes a junction box configured to selectably connect the control and sense wire harness to an aircraft brake actuator, wherein the measured actuation force signal may be received and logged by a method of brake actuation force logging.

In various embodiments, the control and sense wire harness includes signal wiring in electrical connectivity with the load cell and terminated in a connector configured to be received by the junction box, whereby the load cell is field-replaceable. In various embodiments, the control and sense wire harness includes control wiring in electrical connectivity with the plurality of motors and terminated in the connector configured to be received by the junction box, whereby each of the plurality of motors is field-replaceable. In various embodiments, the aircraft brake actuator in electrical connectivity with the junction box and is configured to transmit a force command to the plurality of motors via the control wiring. In various embodiments, the aircraft brake actuator is further configured to log the measured actuation force signal from the load cell by a method of brake actuation force logging.

A method of brake actuation force logging is disclosed. The method may include receiving, by a motor of a braking unit, a force command including a braking instruction, actuating the motor of the braking unit, wherein a braking force is applied to an aircraft main landing gear brake stack in response to the force command, quantizing, by a load cell of the force sensing braking module, the braking force applied by the motor to the aircraft main landing gear brake stack, and transmitting, by the load cell, a measured actuation force signal via a sense wiring of the control and sense wire harness to the junction box.

The method may comprise logging by a memory of the force sensing braking module, the measured actuation force signal. The measured actuation force signal may be conveyed from the junction box to at least one of an EBAC, ABSC, and bus. An aircraft brake actuator may transmit to a junction box of a force sensing braking module, a force command. The junction box may connect through control wiring of a control and sense wire harness to the motor of the braking unit. The method may include receiving a brake actuation force log retrieval request, and retrieving data representative of a logged measured actuation force signal from the memory.

An aircraft brake control and monitoring system is disclosed. The system may include an aircraft brake actuator configured to transmit a force command and to receive and log a measured actuation force signal, a braking unit including a plurality of motors configured to receive the force command and actuate a brake stack in response to the force command, and a force sensing braking module configured to transmit the measured actuation force signal in response to a magnitude of a braking force.

In various embodiments, the force sensing braking module further includes a control and sense wire harness whereby the force command is communicated between the aircraft brake actuator and the plurality of motors and whereby the measured actuation force signal is communicated between the aircraft brake actuator and a load cell. In various embodiments, a junction box is in electrical connectivity with the aircraft brake actuator and connectable to the control and sense wire harness of the force sensing braking module. In various embodiments, the force sensing braking module includes a load cell configured to generate the measured actuation force signal and a control and sense wire harness including control wiring connected to the plurality of motors and sense wiring connected to the load cell. In various embodiments, the braking unit further includes the brake stack. In various embodiments, the force sensing braking module further includes a junction box in electrical connectivity with the aircraft brake actuator and connectable to the control and sense wire harness of the force sensing braking module.

An aircraft brake control and monitoring system is disclosed. The system may include an electrical brake actuation controller, and a first aircraft brake actuator connected to the electrical brake actuation controller and controllable by the electrical brake actuation controller, and a first braking unit connected to the first aircraft brake actuator configured to produce a first measured actuation force signal in response to a first magnitude of a first braking force.

In various embodiments, a second aircraft brake actuator is connected to the electrical brake actuation controller and controllable by the electrical brake actuation controller, and a second braking unit is connected to the second aircraft brake actuator and configured to produce a second measured actuation force signal in response to a second magnitude of a second braking force. In various embodiments, the first aircraft brake actuator is configured to transmit a first force command and to receive the first measured actuation force signal, and a first force sensing braking module is configured to transmit the first measured actuation force signal in response to the first magnitude of the first braking force. In various embodiments, the first force sensing braking module includes a control and sense wire harness whereby the first measured actuation force signal is communicated to the first aircraft brake actuator. In various embodiments, the first force sensing braking module includes a junction box in electrical connectivity with the first aircraft brake actuator and connectable to the control and sense wire harness of the first force sensing braking module. In various embodiments, the first force sensing braking module includes a load cell generating the first measured actuation force signal. In various embodiments, the control and sense wire harness includes control wiring connected to a plurality of motors, and sense wiring connected to the load cell. In various embodiments, the aircraft brake control and monitoring system further includes a brake stack. In various embodiments, the brake stack includes an aircraft main landing gear brake stack.

In accordance with various embodiments, disclosed is a aircraft brake control and monitoring system, including a force sensor system including a plurality of force sensors in mechanical communication with a plurality of brakes; and a processor configured to receive force measurements of each of the plurality of brakes from the plurality of force sensors, the force measurements defined as a force data set, the processor further configured to calculate a force data centrality value based on the force data set, the processor further configured to calculate a force deviation value for each of the plurality of brakes based on the relative forces measured for each of the plurality of brakes compared to the force data centrality value, wherein the processor assigns a health status for each of the plurality of brakes. In one embodiment, the processor assigns a health status for each of the plurality of brakes by analyzing the force deviation value for each of the plurality of brakes via a process control tool. In one embodiment, each of the plurality of brakes is operatively coupled to a wheel of a landing gear of an aircraft. In one embodiment, the force sensor system is configured to obtain multiple brake force data sets over multiple time instances. In one embodiment, the multiple time instances are separated by regular time intervals. In one embodiment, the multiple brake force data sets are obtained from a single flight. In one embodiment, the force sensor system is configured to obtain brake force data from a single flight. In one embodiment, the brake force data is obtained post flight. In one embodiment, each of the force measurements of each of the plurality of brakes is an extreme force of the specific brake. In one embodiment, the aircraft brake control and monitoring system further comprise multiple processors, wherein a communicator system is configured to transmit the force data set over the multiple processors via at least one of a wireless transmission, and a wired transmission. In one embodiment, the force data centrality value comprises at least one of a median value, and a mean value. In one embodiment, the force deviation value comprises one of an absolute difference value, or a ratio value. In one embodiment, the processor assigns a health status via an individual moving range chart.

According to various embodiments, disclosed is a aircraft brake control and monitoring system for monitoring a health status of a brake system of an aircraft, the aircraft brake control and monitoring system including at least one force sensor in mechanical communication with a plurality of brakes of the brake system, the at least one force sensor configured to obtain a brake force data for the plurality of brakes, the brake force data including at least one brake force data set including a plurality of brake forces obtained at a specific time, wherein each brake force of the plurality of brake forces is associated with a specific brake of the plurality of brakes; at least one processor configured to receive the brake force data; a communicator system configured to transmit the brake force data from the at least one force sensor to the at least one processor; wherein the at least one processor is configured to determine a force data centrality value based on the brake force data; wherein the at least one processor is configured to compare the brake force data, with the force data centrality value, by the at least one processor, to generate a force deviation value data set including a plurality of deviation values, wherein each deviation value of the plurality of deviation values is associated with a specific brake of the plurality of brakes; and wherein the at least one processor is configured to analyze the force deviation value data set via a process control tool. In one embodiment, the process control tool is an individual-moving range chart. In one embodiment, the force data centrality value comprises at least one of a median value, and a mean value. In one embodiment, the brake force data comprises multiple brake force data sets obtained over multiple time instances, and over at least one particular time of interest.

According to various embodiments, disclosed is a method of monitoring health of a braking system, including measuring forces of a plurality of brakes; calculating a centrality value for the measured forces, the centrality value based on the measured forces; and assigning a health status to each of the plurality of brakes based on a relationship between the centrality value and the measured force for each of the plurality of brakes. In one embodiment, the method further comprises calculating deviations of each of the measured forces from the centrality value. In one embodiment, the method further comprises indicating the health status for each of the plurality of brakes. In one embodiment, the method further comprises measuring forces of a plurality of brakes over multiple time instances. In one embodiment, the multiple time instances are separated by regular time intervals.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

As disclosed, in various embodiments, an indicator (brake actuator force feedback) may monitor the health of the brake to predict performance deterioration and/or failure, and to indicate maintenance action in order to preclude a service interruption. Furthermore, flight delays and cancellations may be ameliorated. For instance, an electric brake actuator (EBA) may overdrive for various reasons and result in a hot brake, which may thermally damage a landing gear axle. Replacing an axle in service is expensive and lengthy, which may result in excessive delays in which the aircraft is out revenue service for up to several days.

In various embodiments, the disclosure contemplates a health monitoring and prognostics system with a force sensor (load cell) or force estimator system having a plurality of force sensors/estimations in communication with a plurality of brakes. A processor may be configured to receive force measurements, or estimated forces based on a actuator controller algorithm. The force measurement or estimations may be defined as the actuation force dataset. The processor may be configured in numerous ways; for example, to compare the measured or estimated dataset to a reference signature, to that of other load cells from the same brake or to their average, or to all the load cells across all the brakes on the aircraft, to various alert limits (high or low), or to various persistence analytics using statistical process control tools, for example.

Figure 1:
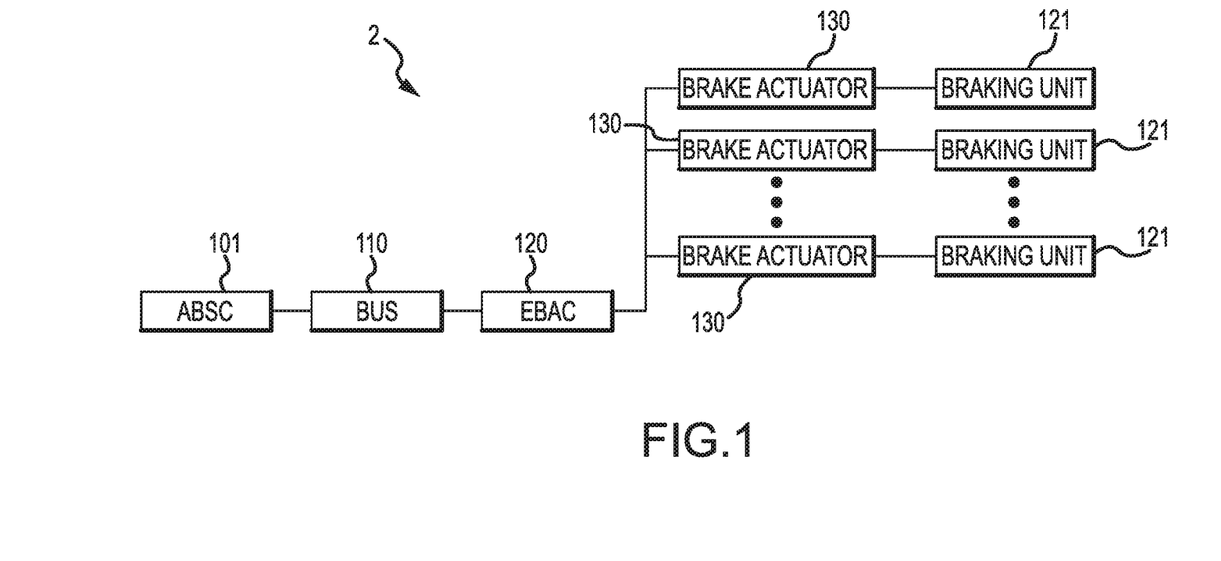
FIG. 1 depicts an example aircraft braking control and monitoring system in accordance with various embodiments.
Figure 2:
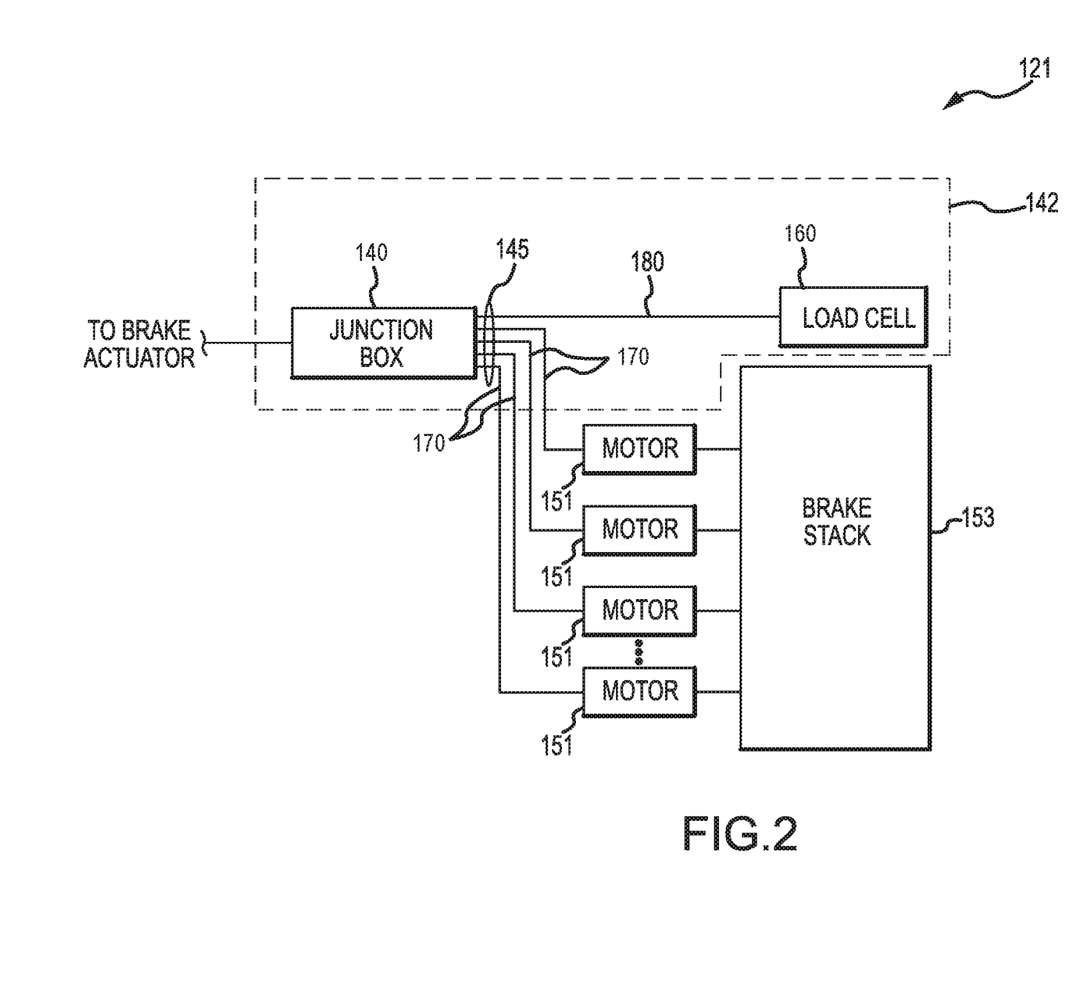
FIG. 2 depicts a braking unit of an aircraft braking and control monitoring system in accordance with various embodiments.

The present disclosure relates to an aircraft brake control and monitoring system 2. With reference to FIGS. 1 and 2, an aircraft brake control and monitoring system 2 in accordance with various embodiments, may have an aircraft brake and steering controller ("ABSC") 101 in communication via a bus 110 with an electrical brake actuation controller 120 ("EBAC").

The EBAC 120 may be responsible for executing brake actuation instructions received from the ABSC 101. The EBAC 120 may direct aircraft brake actuator(s) 130 to cause aircraft main landing gear brake stacks 153 of braking units 121 to mechanically operate in response to these brake actuation instructions. Thus, the directions provided by the EBAC 120 to the aircraft brake actuators 130 maybe called "force commands" delivered to aircraft brake actuator(s) 130 in response to the brake actuation instructions received from the ABSC 101. Moreover, the EBAC 120 may provide force commands to more than one aircraft brake actuator 130. Multiple aircraft brake actuators 130 may be disposed in parallel to provide system redundancy and/or multiple aircraft brake actuators 130 may be arranged to direct multiple braking units 121 to actuate as depicted in FIG. 1. In various embodiments, the EBAC 120 may direct the aircraft brake actuators 130 to operate in concert, or independently, depending on desired braking behavior.

The aircraft brake actuator(s) 130 may comprise a processor configured to receive a force command from an EBAC 120 and generate a signal having a voltage, current, and waveform calibrated to impel a desired mechanical braking force to be exerted on a rotating structure ("actuator signal") by aspects of a braking unit 121. For instance, the actuator signal may be a signal to the motors 151 of the braking unit 121 so that the motors 151 exert a specific amount of force on an aircraft main landing gear brake stack 153. Each aircraft brake actuator 130 may thus drive one or more motor 151 associated with one or more aircraft main landing gear brake stack 153 of one or more braking unit 121. In various embodiments, each aircraft main landing gear brake stack 153 has four associated motors 151. In various embodiments, all four motors 151 are driven in concert by a single aircraft brake actuator 130, or a pair of aircraft brake actuators 130 in parallel for redundancy.

The force commands and brake actuation instructions may comprise signals from various different sources. For example, the force command and/or brake actuation instructions may be an interpretation of the pilot's brake pedal application. The force command and/or brake actuation instructions may be an interpretation of manual and/or auto-brake instructions corresponding to a desired aircraft deceleration rate. The force command and/or brake actuation instructions may be a combination of inputs from various different sources. For example, during a braking event, the ABSC 101 may superimpose a brake release command on top of the force command and/or brake actuation instructions. The brake release command may free up a locked and/or skidding wheel. For example, an anti-skid and/or anti-lock brake command may be superimposed on a force command generated by, for example, a brake pedal.

In various embodiments, a mechanism for monitoring the force associated with each braking unit 121 and/or braking event may be desired, such as for maintenance purposes. For instance, a part manufacturer, or an aircraft operator may desire to retrieved logged data depicting historical forces associated with each braking unit 121. A mechanism for monitoring the force associated with each braking unit 121 and/or braking event may also be desired for in-flight safety purposes, such as to ameliorate brake overheating, uneven brake wear, or uneven braking forces. As such, mechanical faults in the brake system may be detected. For example, by monitoring the force associated with each braking unit 121, failures may be predicted or performance degradation identified and preemptive maintenance action may be taken to prevent a service interruption. As will be discussed, each braking unit 121 comprises an aircraft main landing gear brake stack 153, and a force sensing braking module 142, which among other aspects, includes a load cell 160 associated with the aircraft main landing gear brake stack 153 so that the force associated with the braking unit 121 can be monitored.

A braking unit 121 may comprise various components whereby mechanical braking force is exerted on a rotating structure, such as an aircraft brake rotor, and whereby signals representative of the magnitude of the braking force are generated ("measured actuation force signal"). For instance, a braking unit 121 may comprise a plurality of motors 151 which receive brake actuation instructions from one or more aircraft brake actuator(s) 130 to cause a braking force on an aircraft main landing gear brake stack 153.

A braking unit 121 may comprise an aircraft main landing gear brake stack 153, as mentioned. An aircraft main landing gear brake stack 153 may be a frictional apparatus configured to receive mechanical energy from a plurality of motors 151, for instance, four, and exert a variable coefficient of friction on a rotating mass variable in response to the magnitude of force exerted by the motors 151. For instance, an aircraft main landing gear brake stack 153 may comprise one or more rotors and stators wherein the stators press against the rotors as the rotors move, to cause the rotors to decelerate and/or to resist accelerating.

A braking unit 121 may comprise motors 151. In various embodiments, four motors 151 are associated with each aircraft main landing gear brake stack 153 (and each braking unit 121 includes one aircraft main landing gear brake stack 153, so that four motors 151 are associated with each braking unit 121). A motor 151 may comprise a force generating apparatus configured to convert electrical energy into mechanical energy. For instance, a motor 151 may comprise a motor and/or hydraulic actuator and/or other aspects, such as a ball screw, and/or gearing.

The braking unit 121 may also have a force sensing braking module 142 which comprises aspects configured to evaluate the force on the aircraft main landing gear brake stack 153. A force sensing braking module 142 comprises a collection of features whereby the force exerted by the motors 151 on the aircraft main landing gear brake stack 153 may be evaluated.

The force sensing braking module 142 may comprise a junction box 140. A junction box 140 may comprise a selectable connection site for the selectable electrical connection of other aspects of the force sensing braking module 142 to surrounding systems, such as to the aircraft brake actuators 130 (and/or EBAC 120) and to the motors 151. The load cell 160 of the force sensing braking module 142 may transmit a measured actuation force signal to the aircraft brake actuator 130 via the junction box 140. The motors 151 of the braking unit 121 may also utilize the junction box 140 of the force sensing braking module 142. For instance, the motors 151 may receive an actuator signal from the aircraft brake actuator 130 via the junction box 140.

Thus, one may appreciate that the force sensing braking module 142 also may comprise a control and sense wire harness 145. The control and sense wire harness 145 may provide the electrical connection of the plurality of motors 151 of the braking unit 121 and the electrical connection of the load cell 160 of the force sensing braking module 142 to the other aircraft systems, such as aircraft brake actuators 130.

The control and sense wire harness 145 may comprise control wiring 170 and sense wiring 180. Control wiring 170 may conduct the actuator signal from the junction box 140 to the motor(s) 151 of the braking unit 121. Sense wiring 180 may conduct the measured actuation force signal (a packetized data signal, a voltage, or a current, and/or the like) from the load cell 160 of the force sensing braking module 142 to the junction box 140. The control and sense wire harness 145 may be connectorized with selectably connectable connectors. For example, the control and sense wire harness 145 may be fitted with connectors whereby it may be field-disconnectable from the junction box 140, such as during maintenance and replacement operations. In this manner, junction box 140 provides for ready field replacement of both motors 151 of the braking unit 121 and also load cells 160 of the force sensing braking module 142.

Finally, the braking unit 121 may comprise a load cell 160. The load cell 160 may comprise a sensor disposed in a load path of the aircraft main landing gear brake stack 153, so that the force exerted by the motors 151 on the aircraft main landing gear brake stack 153 may be quantified by the load cell 160. The load cell 160 may generate an electrical signal comprising the measured actuation force signal that is representative of the force exerted by the motor 151 on the aircraft main landing gear brake stack 153. The measured actuation force signal may be a packetized data signal, a voltage, or a current, and/or the like.

Figure 3A:
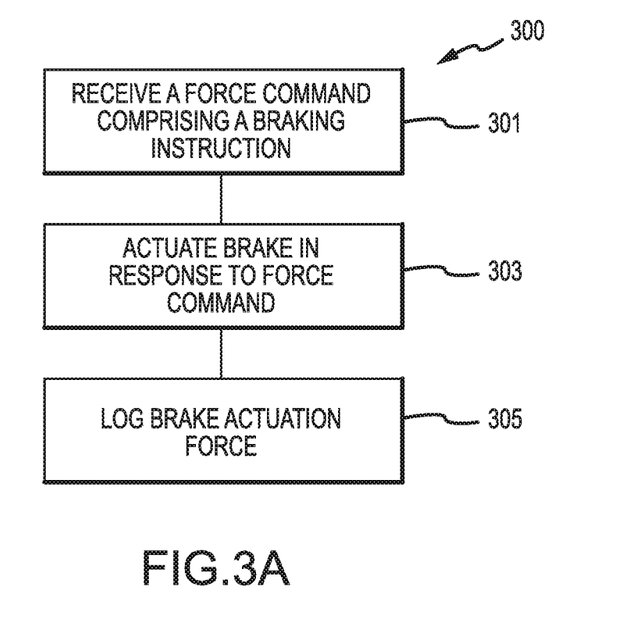
FIG. 3A depicts a flowchart illustrating a method of brake actuation force logging in accordance with various embodiments.

Having discussed various aspects of an aircraft brake control and monitoring system 2, attention is now directed to FIG. 3A, in conjunction with FIGS. 1-2. A method of brake actuation force logging 300 may be performed by the aircraft brake control and monitoring system 2. For example, motors 151 of a braking unit 121 may receive a force command comprising a braking instruction (step 301). For instance, an aircraft brake actuator 130 may transmit to a junction box 140 of a force sensing braking module 142, which connects through control wiring 170 of a control and sense wire harness 145 to the motors 151 of the braking unit 121. The motor 151 may actuate, applying a braking force to an aircraft main landing gear brake stack 153 in response to the force command (step 303). The load cell 160 of the force sensing braking module 142 may quantize the force applied by the motors 151 to the aircraft main landing gear brake stack 153 and may transmit a measured actuation force signal via sense wiring 180 of the control and sense wire harness 145 to the junction box 140 where it is conveyed to an EBAC 120, ABSC 101, and/or other aspect connected to bus 110 for logging. In various embodiments, in addition, the force sensing braking module 142 may comprise a memory wherein the measured actuation force signal is logged (step 305).

Figure 3B:
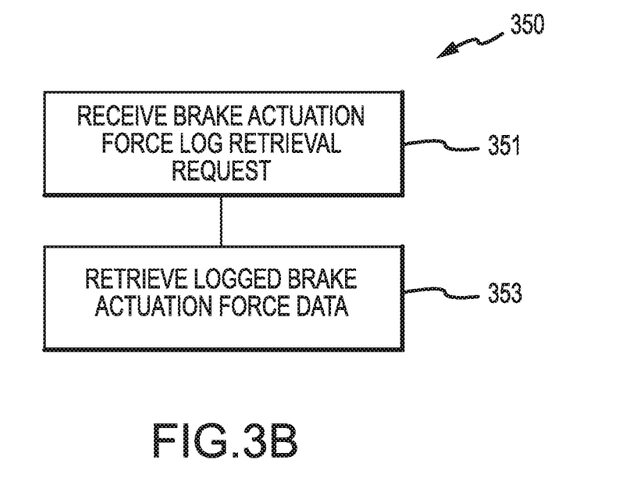
FIG. 3B depicts a flowchart illustrating a method of brake actuation force retrieval in accordance with various embodiments.

With attention now to FIG. 3B, in conjunction with FIGS. 1-2, it may be desirable to retrieve previously logged measured actuation force signals according to a method of brake actuation force retrieval 350. For example, at least one of an EBAC 120, ABSC 101, or force sensing braking module 142 may receive a brake actuation force log retrieval request such as via bus 110 and/or control and sense wire harness 145 (step 351). The relevant module may then retrieve data representative of the logged measured actuation force signal (step 353). For example, data may be desired to be retrieved for transmission to an aircraft parts manufacturer for study, or an aircraft operator for maintenance purposes, and/or a regulatory agency for testing, certification, and/or monitoring. In various embodiments, the data is provided to a human readable display, such as for monitoring by an aircrew during aircraft operations.

As discussed herein, various aspects of the present disclosure may be implemented in various logical units of a processor having a non-transitory memory. In various embodiments, various aspects may be implemented in multiple processors and/or memories. For example, the aspects of the disclosed system and method may be implemented within the EBAC 120. In various embodiments, various aspects of the disclosed system may be implemented within the EBAC 120 and/or the braking unit 121, and/or ABSC 101. Thus, one may appreciate that the ABSC 101, EBAC 120 and/or braking unit 121 (such as the force sensing braking module 142) may comprise a processor and a tangible, non-transitory memory.

In various embodiments, various components such as the EBAC 120, ABSC 101, and/or braking unit 121 (such as the force sensing braking module 142) may be divided into further logical units. For instance, turning now to FIGS. 4-6, in accordance with various embodiments, disclosed is a brake monitoring system 3001 for monitoring the health status of the brakes of an aircraft, the aircraft comprising a plurality of brakes, the brake monitoring system 3001 comprising conducting a statistical comparison of a brake force against a force data centrality value based on force values recorded from the plurality of brakes. According to various embodiments, the statistical analysis may comprise utilizing a process control tool, such as an individual-moving range chart.

Figure 4:
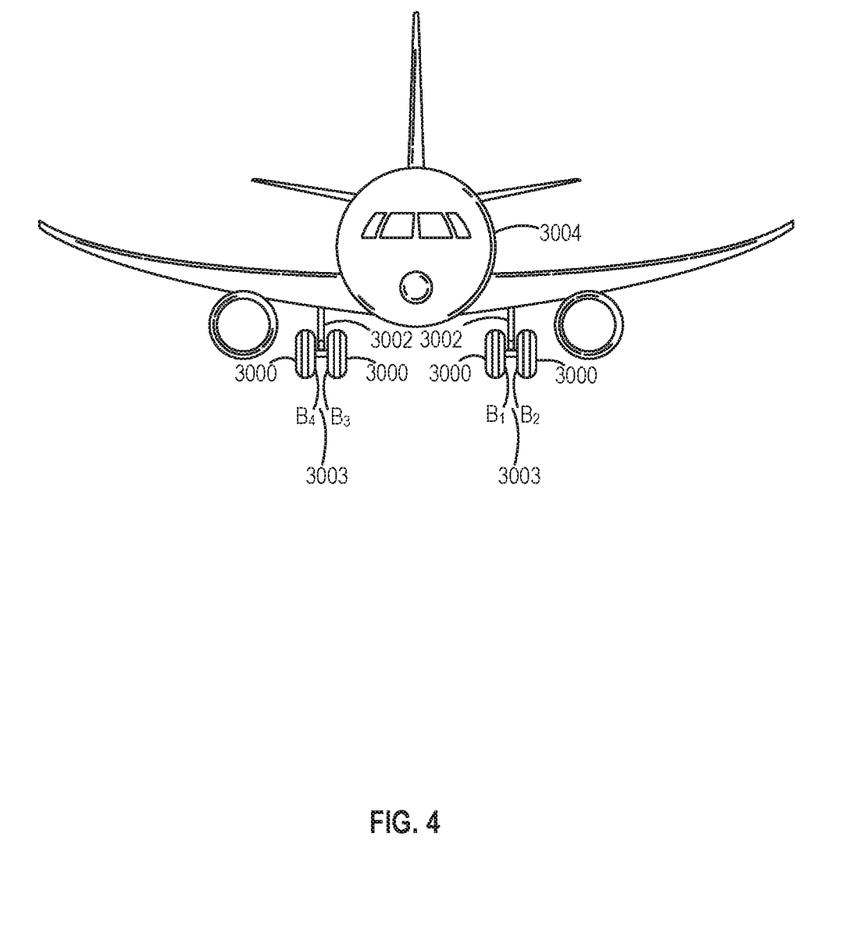
FIG. 4 shows an aircraft comprising a brake system, according to various embodiments.

According to various embodiments, and with reference to FIG. 4, an aircraft 3004 may include one or more landing gears 3002, each comprising one or more wheels 3000, as shown in FIG. 4. According to various embodiments, the aircraft 3004 comprises a brake system 3003 which functions to slow the wheel 3000, and hence the aircraft 3004, such as, for example, during landing or a rejected take off. According to various embodiments, brake system 3003 comprises a plurality (or "n" number) of brakes, B1, B2, B3, . . . Bn; or Bi, where i=1, 2, 3, . . . n, (shown as B1, B2, B3, and B4 in the figure) wherein each brake of the plurality of brakes is operatively coupled to a wheel 3000 of one of the landing gears 3002 of the aircraft 3004.

Figure 5:
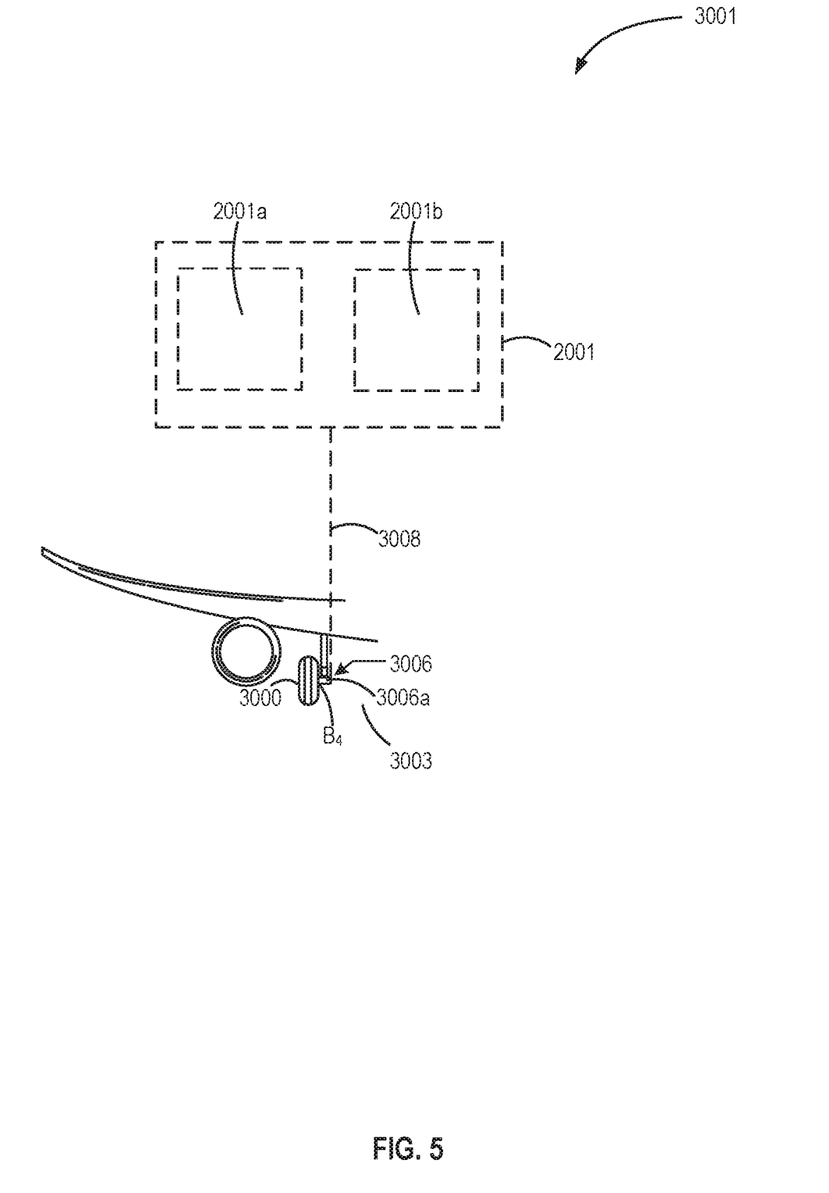
FIG. 5 shows a brake force monitoring system, for the brake system of the aircraft of FIG. 4, according to various embodiments.

According to various embodiments, a brake monitoring system 3001 shown in FIG. 5, may comprise a force sensor system 3006, configured to obtain brake force data from the brake system 3003, at least one processor 2001 configured to analyze brake force data received from force sensor system 3006, and a communicator system 3008 configured to communicate or transmit the brake force data from the force sensor system 3006 to the at least one processor 2001. According to various embodiments, the at least one processor 2001 is configured to analyze brake force data via a brake monitoring method 1000 (shown in FIG. 6) in order to determine the health status of at least one brake of brake system 3003. According to various embodiments, the at least one processor 2001 is further configured to indicate the health status of the at least one brake.

Figure 6:
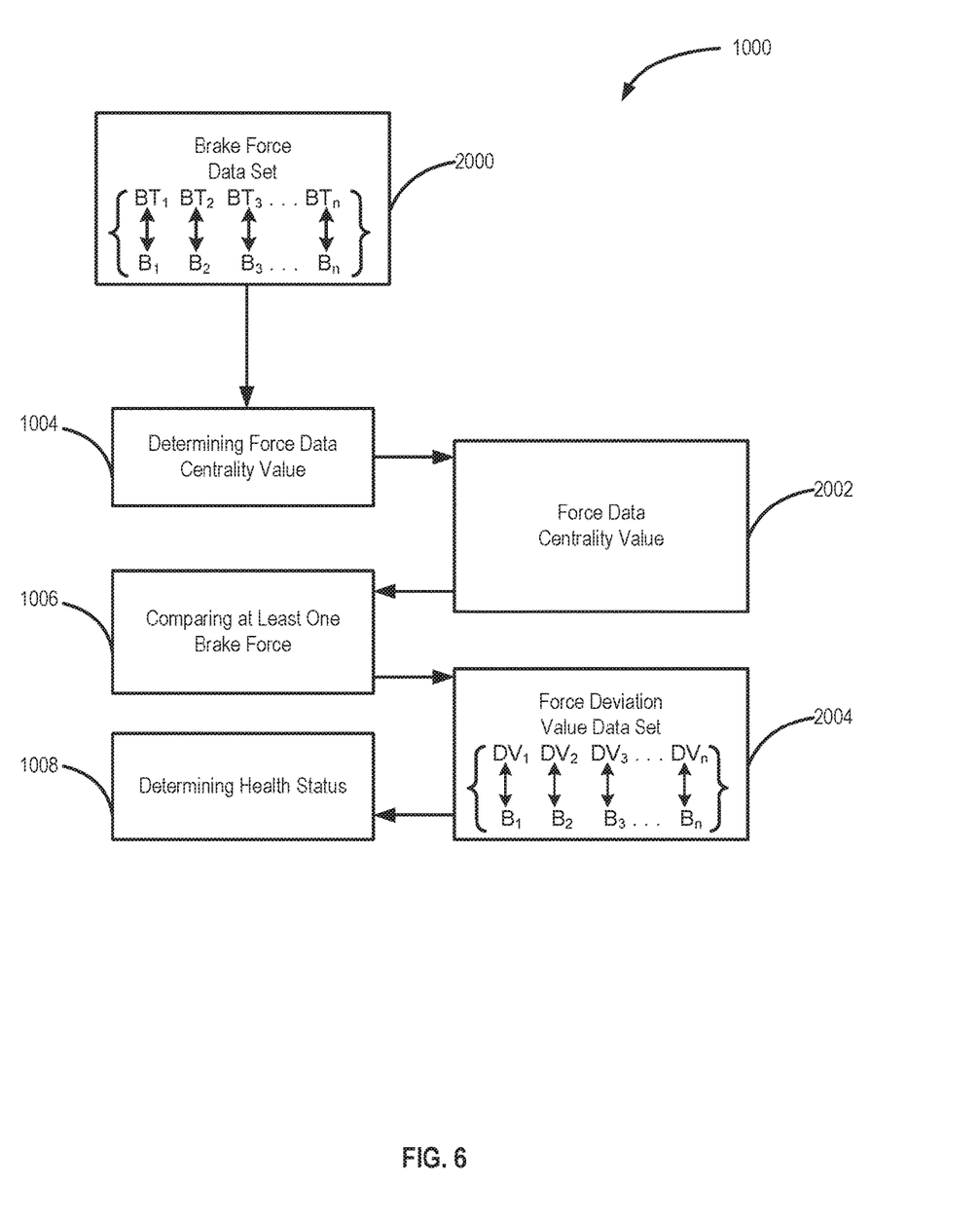
FIG. 6 is a flow chart for a brake monitoring method for the brake force monitoring system of FIG. 5, according to various embodiments.

According to various embodiments, brake monitoring method 1000 comprises conducting a statistical comparison of a brake force against a force data centrality value based on force values recorded from the plurality of brakes. In various embodiments, the statistical analysis may comprise utilizing a process control tool, such as an individual-moving range chart.

According to various embodiments, brake force data obtained by force sensor system 3006, comprises at least one brake force data set 2000. The at least one brake force data set 2000 comprises a plurality (or "n" number) of brake forces, BF1, BF2, BF3 . . . BFn (or BFi, where i=1, 2, 3, . . . n), obtained at a specific time instance, wherein each brake force, BFi, of the plurality of brake forces is associated with a specific brake Bi of the plurality of brakes of the brake system 3003. According to various embodiments, aircraft 3004 may have eight wheels 3000 each comprising a brake Bi, i=1, . . . , 8. Thus, according to various embodiments, the at least one brake force data set 2000 may comprise 8 brake forces, BFi, (i=1, 2, 3, . . . , 8).

According to various embodiments, force sensor system 3006 of brake monitoring system 3001, comprises at least one force sensor (represented by force sensor 3006a) in mechanical communication with each brake Bi. According to various embodiments, force sensor system 3006 comprises a plurality of force sensors 3006a. According to various embodiments, force sensor 3006a may be, for example, a load cell 160 (FIGS. 1-3) according to various embodiments. According to various embodiments, force sensor 3006a may be embedded in a component of the brake, for example, to obtain the brake force BFi (or indication of the brake force, such as a voltage) of the brake. Under typical operating circumstances, the force of a brake will change over time, and different components of the brake will register different force measurements. Thus, according to various embodiments, force sensor system 3006 is configured to measure the brake force BFi of each brake Bi of the brake system 3003, under similar conditions, such that the brake forces can be meaningfully compared. To that end, the brake forces, BFi, of the at least one brake force data set 2000 are measured at the same time or at a specific time instance, according to various embodiments. Additionally, according to various embodiments, the brake forces, BFi (i=1 . . . n), are measured from the same brake component of each brake, Bi. According to various embodiments, the brake forces, BFi, of the at least one brake force data set 2000 may be measured for all the brakes, Bi, at an instant of time, or otherwise, over an amount of time sufficient to obtain a force indication or reading by the force sensor 3006a, according to various embodiments. According to various embodiments, the brake forces, BFi, of the at least one brake force data set 2000 may be measured over a prolonged time period, wherein, according to various embodiments, an extreme force reading over the time period may be registered as the brake force BFi for the specific brake Bi. According to various embodiments, such extreme force may comprise the greatest force registered over the prolonged time period.

According to various embodiments, brake force data obtained by force sensor system 3006, may comprise obtaining more than one or multiple brake force data sets 2000 over multiple specific times or multiple time instances. As such, the brake force data may comprise multiple brake force data sets 2000 which are correlated to time. According to various embodiments, the times for obtaining multiple brake force data sets 2000 may be separated by regular time intervals, the multiple brake force data sets 2000 may be obtained over a specific time range comprising multiple time intervals. For example, a data set may be collected every 2 minutes, for 22 minutes, thus obtaining 11 data sets.

According to various embodiments, brake force data 2000 may be obtained at particular times of interest, including times during or shortly after the brakes Bi, of aircraft 3004 may be used. For example, particular times of interest for obtaining brake force data may include the time after a landing and/or rollout of the aircraft 3004, taxing before takeoff, and shortly after takeoff, according to various embodiments.

According to various embodiments, the at least one processor 2001 is configured to analyze the brake force data, comprising the at least one brake force data set 2000 obtained by force sensor system 3006, via brake monitoring method 1000, illustrated in FIG. 6. According to various embodiments, the at least one processor 2001 carries out at least a step 1004 of determining a force data centrality value ("CV") 2002, a step 1006 of comparing at least one brake force of the plurality of brake forces BFi, with the force data centrality value 2002, and a step 1008 of determining the health status of at least one brake, of brake monitoring method 1000.

According to various embodiments, step 1004 of determining a force data centrality value ("CV") 2002 is based on the at least one brake force data set 2000 obtained by the force sensor system 3006. According to various embodiments, the force data centrality value 2002 may be the median brake force of the plurality of brake forces BFi, of the at least one brake force data set 2000. According to various embodiments, the force data centrality value 2002 may be the arithmetic mean brake force of the plurality of brake forces BFi, of the at least one brake force data set 2000. Various method of obtaining median or arithmetic mean values are known in the art. Such methods may include, for example, excluding outlier values, obtaining a median average, etc., according to various embodiments.

Additionally, other values representing a force data centrality value 2002, and methods of derivation will be apparent to one skilled in the art.

According to various embodiments, the step 1006 of comparing at least one brake force of the plurality of brake forces BFi, with the force data centrality value 2002, comprises obtaining a deviation value DV for the at least one brake force. According to various embodiments, step 1006 comprises comparing each brake force BFi of the at least one brake force data set 2000 against the force data centrality value 2002, to generate at least one force deviation value data set 2004, comprising a plurality of deviation values. According to various embodiments, the at least one force deviation value data set 2004 comprises an "n" number of deviation values DV1, DV2, DV3 . . . DVn, (or DVi, where i=1, 2, 3, . . . n), wherein n is the number of brakes, wherein each deviation value is associated with a specific brake (i.e. B1, B2, B3, . . . Bn) of the at least one brake force data set 2000, as shown in FIG. 6. According to various embodiments, the step 1006 of comparing each brake force, BFi, with the force data centrality value 2002 obtained in step 1004, and obtaining a deviation value DVi for each brake, may comprise determining an absolute difference between the force data centrality value 2002 and each brake force, BFi, of the plurality of break forces, wherein DV1=|CV−BF1|; DV2=|CV−BF2|; DV3=|CV−Bt3| . . . DV4=|CV−BFn|; or DVi=|CV−BFi|, where i=1→n, wherein the at →n, wherein the at least one force deviation value data set 2004 is a force deviation data set comprising a plurality of deviations (DV1, DV2, DV3 . . . DVn; or DVi, where i=1→n), wherein each deviation DVi of the plurality of deviations is associated with a brake, Bi, of the plurality of brakes (i.e. B1, B2, B3, . . . Bn; or Bi, where i=1, . . . n). According to various embodiments, obtaining a deviation value DVi for each brake, may comprise determining a ratio value, which may be a quotient or a multiple of a quotient between BFi and CV, i.e., DVi=BFi/CV or a multiple thereof, according to various embodiments. According to various embodiments, brake monitoring method 1000 may comprise obtaining multiple force deviation value data sets 2004 for multiple brake force data sets 2000.

According to various embodiments, the step 1008 of determining the health status of at least one brake Bi of the brake system 3003, comprises analyzing the at least one force deviation value data set 2004 obtained in step 1006. According to various embodiments, step 1008 of determining the health status of at least one brake Bi, may comprise determining the health status of all the brakes Bi of the brake system 3003 of the aircraft 3004. According to various embodiments, step 1008 of determining the health status of at least one brake may comprise a process control analysis of the at least one force deviation value data set 2004.

According to various embodiments, step 1008 of determining the health status of at least one brake Bi, may comprise performing a statistical analysis on at least one force deviation value data set 2004. According to various embodiments, the force deviation values set may be analyzed through a statistical process control tool comprising individual moving range chart (Shewhart chart). Such analysis may indicate whether the brake system is operating properly (i.e. is stable), or not, and may be used to determine the health status of each brake (i.e. based on its deviation value). Other methods of statistical analysis include other quality control tools may be apparent to one skilled in the art. According to various embodiments, the at least one force deviation value data set 2004 may be obtained at a specific time instance. According to various embodiments, at least one force deviation value data set 2004 may be obtained at a specific time of interest, such as post flight. According to various embodiments, multiple force deviation value data sets 2004, which are correlated to time may be statistically analyzed. According to various embodiments, the multiple force deviation value data sets 2004, which are correlated to time, may be from a single flight. According to various embodiments, the multiple force deviation value data sets 2004, which are correlated to time, may be from multiple flights. According to various embodiments, the multiple force deviation value data sets 2004, which are correlated to time, may be from a single particular time of interests, or from multiple particular times of interests. According to various embodiments, the multiple force deviation value data sets 2004, which are correlated to time, may be from a single aircraft.

According to various embodiments, the at least one processor 2001 is further configured to indicate the health status of the at least one brake of the brake system 3003. According to various embodiments, the at least one processor 2001 may indicate the health status of each brake or of the brake system 3003. According to various embodiments, the at least one processor may comprise a display unit, such as a cockpit display unit, for indicating brake health status. According to various embodiments, indicating brake health status of at least one brake Bi may comprise indicating a poor health status of any brake(s) found to have a poor health status, on a display device which may be a component of, or in communication with the at least one processor 2001, according to various embodiments. Such indication may be relayed via multiple processors 2001, via the communicator system 3008, according to various embodiments.

According to various embodiments, communicator system 3008 of brake monitoring system 3001 is configured to communicate or transmit the brake force data from force sensor system 3006 to the at least one processor 2001, via a wired transmission, a wireless transmission, or both a wireless and a wired transmission, according to various embodiments. According to various embodiments, a wired transmission, may comprise at least one processor 2001 on the aircraft 3004. According to various embodiments, the at least one processor 2001 may comprise multiple processors, wherein the brake force data may be transmitted via multiple processors 2001, and may be transmitted both by wire and wirelessly. For example, the brake force data may be transmitted by a wired connection to a first processor 2001a on the aircraft 3004, then wirelessly transmitted to a second processor 2001b, which may be onboard the aircraft 3004 or outside the aircraft 3004, as shown in FIG. 5, according to various embodiments. According to various embodiments, the first processor 2001a may comprise a brake control unit on the aircraft 3004, for example, which may convert a voltage produced by the force sensor system 3006 of at least one brake Bi into a respective force reading that is communicated to the second processor 2001b, according to various embodiments. According to various embodiments, the force sensor system 3006 and the at least one processor 2001 may comprise a single component which may perform both sensing and processing functions, according to various embodiments.

According to various embodiments, the steps of brake monitoring method 1000 may be carried out by the at least one processor 2001, wherein the at least one processor may comprise a single processor on the aircraft 3004 or off the aircraft 3004, according to various embodiments. According to various embodiments, the steps of brake monitoring method 1000 may be carried out by multiple processors 2001, which may be on the aircraft 3004, outside the aircraft 3004, or both on the aircraft 3004 and outside the aircraft 3004, according to various embodiments. According to various embodiments, brake force data may be obtained via the force sensor system 3006, and transmitted via communicator system 3008 to a first processor 2001a comprising a data concentrator on the aircraft 3004, then provided to a second processor 2001b comprising a central maintenance system, which may be on or off the aircraft 3004, according to various embodiments, then either the second processor 2001b, or a third processor, which may be on or off the aircraft may carry out the steps of brake monitoring method 1000, according to various embodiments.

In various embodiments, while the aircraft brake control and monitoring systems described herein have been described in the context of aircraft applications; however, one will appreciate in light of the present disclosure, that the system described herein may be used in connection with various other vehicles, for example, cars, trucks, busses, trains, boats, and submersible vehicles, or any other vehicle or device, in which brake control and monitoring is desirable, for example, automobile braking systems.

Tangible non-transitory memory as used herein may include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. § 101, so long as and to the extent In re Nuijten remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft brake control and monitoring system, comprising: a control and sense wire harness;
   a load cell disposed in a load path between a plurality of motors and a main landing gear brake stack, wherein the load cell is configured to provide a measured actuation force signal representative of a force exerted by the plurality of motors on the main landing gear brake stack to the control and sense wire harness;
   a junction box configured to selectably connect the control and sense wire harness to a brake actuator and the plurality of motors, wherein the measured actuation force signal may be received and logged by a method of brake actuation force logging;
   a force sensor system comprising a plurality of force sensors in mechanical communication with a plurality of brakes the plurality of brakes including the main landing gear break stack; and
   a processor configured to receive force measurements of each of the plurality of brakes from the plurality of force sensors, the force measurements defined as a force data set, calculate a single force data centrality value based on the force data set, calculate a force deviation value for each of the plurality of brakes based on the relative forces measured for each of the plurality of brakes compared to the single force data centrality value, and assign a health status for each of the plurality of brakes.

2. The aircraft brake control and monitoring system of claim 1, wherein the processor is configured to assign the health status for each of the plurality of brakes by analyzing the force deviation value for each of the plurality of brakes via a process control tool.

3. The aircraft brake control and monitoring system of claim 1, wherein the force sensor system is configured to obtain multiple brake force data sets over multiple time instances.

4. The aircraft brake control and monitoring system of claim 1, further comprising multiple processors, wherein a communicator system is configured to transmit the force data set over the multiple processors via at least one of a wireless transmission and a wired transmission.

5. The aircraft brake control and monitoring system of claim 1, wherein the single force data centrality value comprises at least one of a median value and a mean value; and wherein the force deviation value comprises one of an absolute difference value and a ratio value.

6. The aircraft brake control and monitoring system of claim 1, wherein the processor assigns the health status via an individual moving range chart.

7. An aircraft brake control and monitoring system comprising:
   an electrical brake actuation controller;
   a first aircraft brake actuator connected to the electrical brake actuation controller and controllable by the electrical brake actuation controller; a first braking unit connected to the first aircraft brake actuator, the first braking unit comprising a first plurality of motors and a first brake stack;
   a first load cell disposed in a first load path between the first plurality of motors and the first brake stack, the first load cell configured to provide a first measured actuation force signal representative of a first braking force applied to the first brake stack; and
   a processor configured to receive the first measured actuation force signal, calculate a force data centrality value based on the first measured actuation signal and at least one other force actuation signal received from one of a plurality of brakes, calculate a force deviation value for each of the plurality of brakes based on the relative forces measured from each of the plurality of brakes compared to the force data centrality value, and assigns a health status for each of the plurality of brakes.

8. The aircraft brake control and monitoring system according to claim 7, further comprising:
   a second aircraft brake actuator connected to the electrical brake actuation controller and controllable by the electrical brake actuation controller; a second braking unit connected to the second aircraft brake actuator, the second braking unit comprising a second plurality of motors and a second brake stack; and
   a second load cell disposed in a second load path between the second plurality of motors and the second brake stack, the second load cell configured to provide a second measured actuation force signal representative of a second braking force applied to the second brake stack.

9. The aircraft brake control and monitoring system according to claim 7,
   wherein the first aircraft brake actuator is configured to transmit a first force command and to receive the first measured actuation force signal; and
   further comprising a first force sensing braking module configured to transmit the first measured actuation force signal in response to the first braking force.

10. The aircraft brake control and monitoring system according to claim 9, wherein the first force sensing braking module comprises:
    a control and sense wire harness whereby the first measured actuation force signal is communicated to the first aircraft brake actuator.

11. The aircraft brake control and monitoring system according to claim 10, wherein the first force sensing braking module comprises:
    a junction box in electrical connectivity with the first aircraft brake actuator and connectable to the control and sense wire harness of the first force sensing braking module.

* * * * *